United States Patent
Walker et al.

(10) Patent No.: US 10,497,282 B1
(45) Date of Patent: Dec. 3, 2019

(54) PHYSICAL MOVEMENT SIMULATION ON A DISPLAY DEVICE

(71) Applicant: INTERNATIONAL BUSINESS MACHINES CORPORATION, Armonk, NY (US)

(72) Inventors: Keith R. Walker, Austin, TX (US); James E. Bostick, Cedar Park, TX (US); Danny Y. Chen, Austin, TX (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/176,606

(22) Filed: Oct. 31, 2018

(51) Int. Cl.
G09B 21/00 (2006.01)
G06K 9/00 (2006.01)
G09G 5/12 (2006.01)
G05D 3/20 (2006.01)

(52) U.S. Cl.
CPC ............. *G09B 21/008* (2013.01); *G05D 3/20* (2013.01); *G06K 9/00718* (2013.01); *G09B 21/004* (2013.01); *G09G 5/12* (2013.01); G09G 2354/00 (2013.01)

(58) Field of Classification Search
CPC ................ G09B 21/008; G09B 21/004; G06K 9/00718; G09G 5/12
USPC .......................................................... 348/62
See application file for complete search history.

(56) References Cited

U.S. PATENT DOCUMENTS

| 5,731,832 A | 3/1998 | Ng |
| 5,793,918 A | 8/1998 | Hogan |
| 6,493,041 B1 | 12/2002 | Hanko et al. |
| 8,552,883 B1 | 10/2013 | Su |
| 2011/0304633 A1* | 12/2011 | Beardsley ............. B25J 9/1666 345/474 |

FOREIGN PATENT DOCUMENTS

EP    0687105    12/1995

OTHER PUBLICATIONS

Wall Street Journal, "Harvard Unleashes Swarm of Robots", https://www.youtube.com/watch?v=2lAluwgAFDO, YouTube, Aug. 14, 2014; 1 page.
Dededeno "What's it like to be hearing impaired?—See here", https://www.youtube.com/watch?v=v9CawJSUy2c, YouTube, Jun. 5, 2007; 1 page.
Anonymous, "A self-organizing thousand-robot swarm", Wyss Institute, https://wyss.harvard.edu/a-self-organizing-thousand-robot-swarm, Aug. 14, 2017; 7 pages.

(Continued)

*Primary Examiner* — Jeffery A Williams
(74) *Attorney, Agent, or Firm* — Brian Restauro; Andrew D. Wright; Roberts Mlotkowski Safran Cole & Calderon, P.C.

(57) ABSTRACT

A computer-implemented method includes: displaying, by a computer device, video content on a display of the computer device; determining, by the computer device, a moving object in the video content; and controlling, by the computer device, a plurality of microbots to move, on the display, over locations of the object in the video content.

20 Claims, 5 Drawing Sheets

(56) References Cited

OTHER PUBLICATIONS

WikiPedia, "Swarm Robotics", https://en.wikipedia.org/wiki/Swarm_robotics, accessed Jan. 13, 2018; 8 pages.
Heikkila et al., "A Texture-based Method for Detecting Moving Objects", Infotech Oulu and Department of Electrical and Information Engineering, 2004; 10 pages.
Sturdevant, "Use computer vision to detect and track moving objects in video", https://developer.ibm.com/code/2018/05/11/using-computer-vision-to-detect-and-track-moving-objects-in-video/, IBM, May 11, 2018; 6 pages.
WikiPedia, "Microbotics", https://en.wikipedia.org/wiki/Microbotics, accessed Sep. 30, 2018; 2 pages.
WikiPedia, "Swarm robotic platforms", https://en.wikipedia.org/wiki/Swarm_robotic_platforms, accessed Sep. 30, 2018; 5 pages.
Ackerman, "You Can't Touch Harvard's New Ambulatory MicroRobot", IEEE Spectrum, https://spectrum.ieee.org/automaton/robotics/robotics-hardware/you-cant-touch-harvards-new-ambulatory-microrobot, Feb. 8, 2018; 4 pages.
Goldberg et al., "Power and Control Autonomy for High Speed Locomotion With an Insect-Scale Legged Robot", IEEE, Dec. 2017; 7 pages.
"List of IBM Patents or Patent Applications Treated as Related", dated Oct. 8, 2019, 1 page.
Specification and Drawings for "Physical Movement Simulation on a Display Device" for related U.S. Appl. No. 16/595,923, filed Oct. 8, 2019, 38 pages.

* cited by examiner

PHYSICAL MOVEMENT SIMULATION ON A DISPLAY DEVICE

BACKGROUND

The present invention relates generally to computer displays and, more particularly, to systems and methods for simulating physical movement on a computer display device.

Visual impairment, also known as vision impairment or vision loss, is a decreased ability to see. There are a number of approaches related to computer displays that assist people who suffer from visual impairment.

SUMMARY

In a first aspect of the invention, there is a computer-implemented method including: displaying, by a computer device, video content on a display of the computer device; determining, by the computer device, a moving object in the video content; and controlling, by the computer device, a plurality of microbots to move, on the display, over locations of the object in the video content.

In another aspect of the invention, there is a computer program product including a computer readable storage medium having program instructions embodied therewith. The program instructions are executable by a computing device to cause the computer device to: display video content on a display of the computer device; determine a moving object in the video content; and control a plurality of microbots to move, on the display, over locations of the object in the video content.

In another aspect of the invention, there is system including a processor, a computer readable memory, and a computer readable storage medium. The system includes: program instructions to display video content on a display of the computer device; program instructions to determine a moving object in the video content; and program instructions to control a plurality of microbots to move, on the display, over locations of the object in the video content such that the plurality of microbots move in synchronous motion with the object as the video content is displayed on the display. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
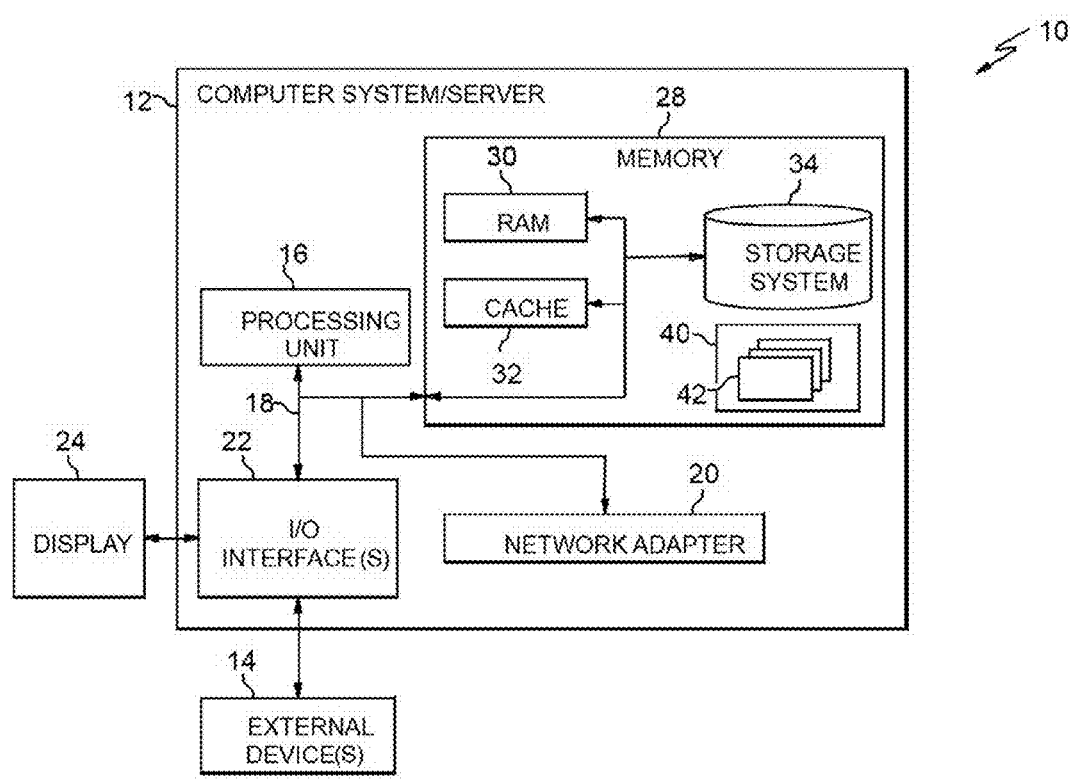
FIG. 1 depicts a computer infrastructure according to an embodiment of the present invention.

The present invention relates generally to computer displays and, more particularly, to systems and methods for simulating physical movement on a computer display device. According to aspects of the invention, there is a system and method for physically displaying movement in a visual display including: receiving video content, a portion of which includes a moving image; and replacing the moving image with a plurality of tiny movable robots that simulate the moving image. In embodiments, the robots display the video content.

Many visually impaired individuals are not completely blind and, instead, have some degree of vision. Such visually impaired individuals may still be able to see some of the content displayed on a computer display, but may not be able to see the movement of an object shown in the content. To address this problem, aspects of the invention control the movement of plural robots on a surface of a computer display to simulate the movement of an object in the content being shown on the display. The physical movement of the robots in synchronous motion with the content being shown on the display assists a visually impaired user in receiving the content.

Aspects of the invention provide a technical solution to the technical problem of visually impaired individuals having trouble using computer displays. In embodiments, the technical solution includes controlling the movement of specialized machines in the form of microbots to move in synchronous motion with an object that is part of video content being shown on a computer display. In some embodiments, the technical solution also includes using computer vision based object detection to determine a location of the object in the video content. In some embodiments, the technical solution further includes utilizing computer-based self-assembly techniques amongst the microbots, where computer-based self-assembly is rooted in computer technology.

In accordance with a particular embodiment, software installed on a computer device identifies dynamic properties of digital objects (referred to herein as objects) that are moving in video content that is being displayed by a computer display of the computer device. The dynamic properties may include one or more of: movement direction, movement speed, and type of movement. Based on the identifying the dynamic properties, the software causes a number of very small robots (e.g., microbots) to arrange over the object included in the video content, where the number and location of microbots are controlled to replicate the same size and shape as the object. In embodiments, the cluster of microbots simulates the exact dynamic properties of the moving object and is synchronized with the moving object. In embodiments, the movement pattern of each participating microbot is calculated dynamically based on the movement propriety of the moving object so that the combination of plural microbots simulates the movement of the object.

In embodiments, each of the microbots is covered with a display layer. In this manner, an array of these small display layers moves with the object when the plurality of microbots moves with the object. In this embodiment, portions of the digital content being displayed on the computer display are also shown on the respective display layers of the microbots. In this manner, a user can visualize and/or feel the physical movement of the object with synchronized dynamic properties of the object.

In additional embodiments, the arrangement and dynamic properties of the microbots are controlled dynamically based on a level of zoom selection and external touch force applied on the microbots. In aspects, when a user touches one or more of the microbots in the plurality of microbots, the system detects the touch pressure applied by the user and controls one or more of the microbots to compensate for the applied touch pressure, e.g., by speeding up, applying more motive force, etc. In this manner, appropriate power is generated by the one or more of the microbots to attempt to maintain (or regain) the synchronization between the microbots and the movement of the object in the video content.

In additional embodiments, the system includes control options (e.g., through a service provider module) to flag objects in a video for synchronization. In this manner, the system is configured to determine and eliminate some movements from the synchronization described hereon. In aspects, the system also limits the movement of the microbots using safety controls based on at least one of: boundary; dimension; size; color; location; and relative distance to surrounding objects.

In additional embodiments, the system includes a self-learning module configured to train the system based on user interaction and configuration pattern, feedback, and trend analysis. In this embodiments, the system may also include a complementing scene analysis tool configured to avoid synchronizing similar objects movement in other similar videos.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
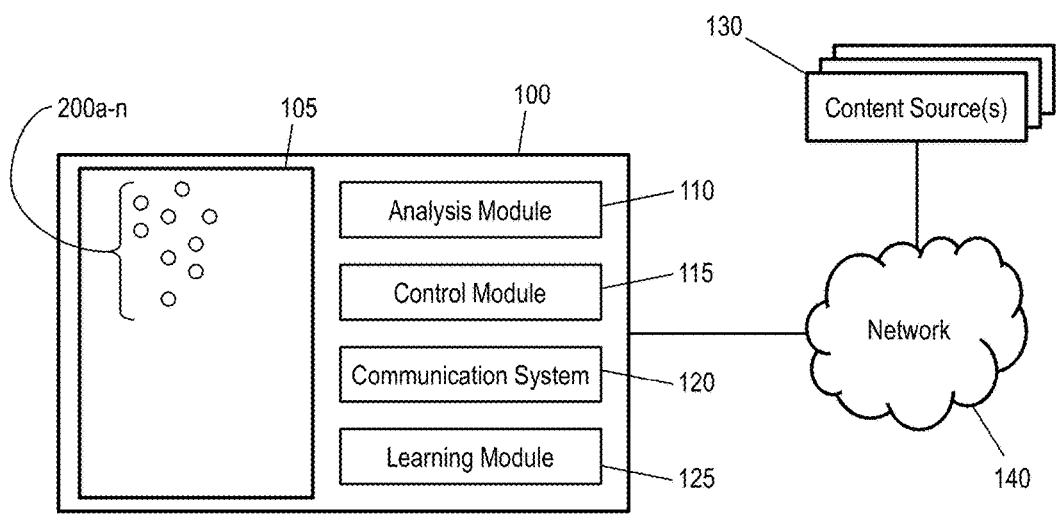
FIG. 2 shows a block diagram of an exemplary system in accordance with aspects of the invention.

FIG. 2 shows a block diagram of an exemplary system in accordance with aspects of the invention. The system includes a computer device 100 and a plurality of microbots 200a-n. The computer device 100 comprises one or more elements of the computer system 12 of FIG. 1, such as a processor, bus, memory, and network adapter. In embodiments, the computer device 100 comprises a display 105, an analysis module 110, a control module 115, a communication system 120, and a learning module 125. The display 105 is a video display such as an LCD (liquid crystal display) or an OLED (organic light emitting diode) display, for example.

The analysis module 110, control module 115, and learning module 125 are each program modules such as program module 42 of FIG. 1, and are configured to perform one or more of the processes describes herein. In embodiments, the computer device 100 may include additional or fewer modules than those shown in FIG. 2. In embodiments, separate modules may be integrated into a single module. Additionally, or alternatively, a single module may be implemented as multiple modules.

According to aspects of the invention, the analysis module 110 is configured to analyze video content that is displayed on the display 105 to determine a location of an object within the video content. According to aspects of the invention, the control module 115 is configured to generate control signals that are transmitted to the microbots 200a-n by the communication system 120. The control signals cause the microbots 200a-n to move to the locations determined by the analysis module 110. In embodiments, the analysis module 110 and the control module 115 are configured to analyze the video content and control the microbots 200a-n in real time such that the microbots 200a-n are caused to move in synchronous motion with the object in the video content.

In embodiments, the video content displayed by the display 105 is received from one or more external content sources 130 via a network 140. The video content may comprise but is not limited to streaming video data. The network 140 may comprise a communication network or combination of communication networks including one or more of a LAN, WAN, and the Internet. Alternatively to being received via the network 140, the video content may be stored and accessed locally in permanent or removable memory of the computer device 100.

Figure 4A:
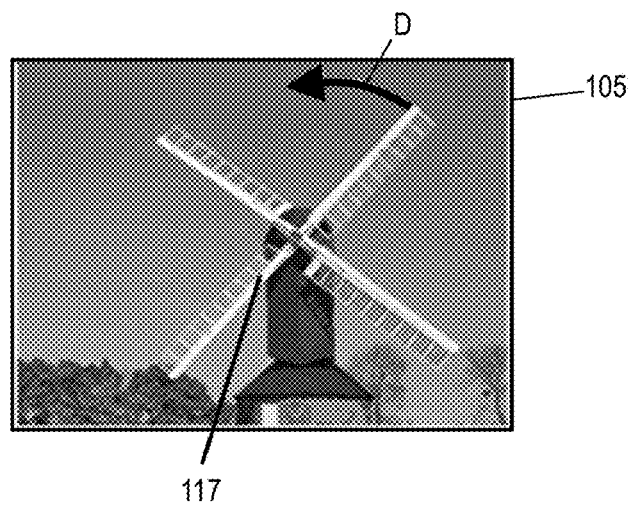
FIGS. 4A-C show an exemplary implementation in accordance with aspects of the invention.
Figure 4B:
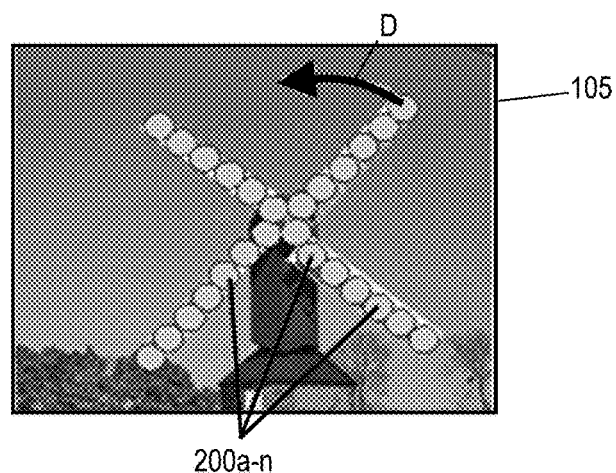
Figure 4C:
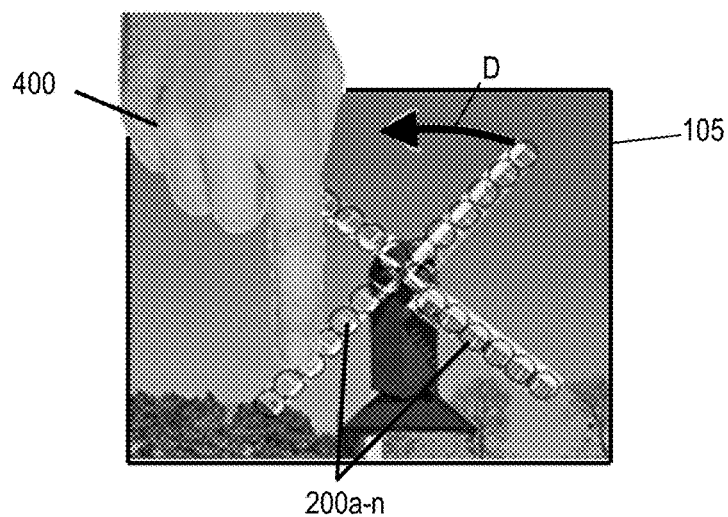

FIGS. 4A-C depict an exemplary use case that illustrates aspects of the invention. As shown in FIG. 4A, the video content shown on the display 105 includes a video of a windmill with blades 117 of the windmill turning in the direction D. In accordance with aspects of the invention, the analysis module 110 determines that the blades 117 are an object that is moving in the video content, determines a location of the blades 117 in each frame of the video content, and passes the location information to the control module 115. The control module 115 causes the microbots 200a-n to move to the determined the location of the blades, such that the microbots 200a-n cover the image of the blades 117 on the display 105 as shown in FIG. 4B. Continuing this example, the analysis module 110 and the control module 115 perform this determination and control continuously in real time with respect to the video content shown on the display 105, such that the microbots 200a-n are controlled to move on the surface of the display 105 in synchronous motion with the blades 117 of the windmill. In this manner, as the video content shows the blades 117 moving, the microbots 200a-n are controlled to move with the blades 117. As illustrated in FIG. 4C, in embodiments each of the microbots 200a-n is controlled to display a respective portion of the video content, such that the plurality of microbots 200a-n mirrors a portion of the video content that is covered by the microbots 200a-n on the display 105

Figure 3:
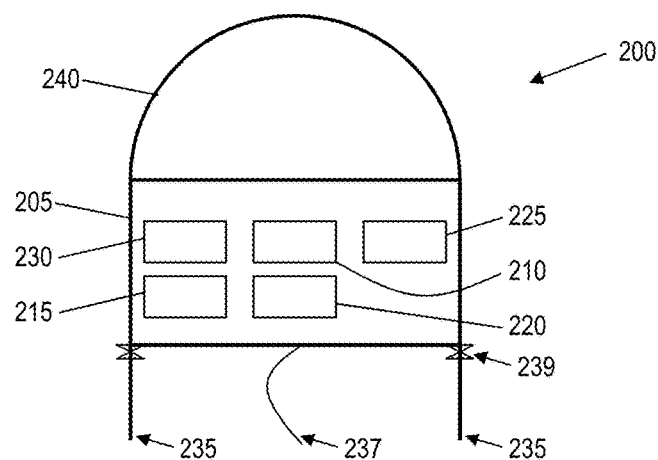
FIG. 3 shows an exemplary microbot in accordance with aspects of the invention.

Referring to FIG. 3, an exemplary microbot 200 representing a respective one of the plural microbots 200a-n is shown. As used herein, microbot refers to a miniature mobile robot with characteristic dimensions less than 1 mm. The term can also be used for robots capable of handling micrometer size components. In embodiments, the microbot 200 includes a chassis 205, a controller 210, a battery 215, a motor 220, one or more sensors 225, a communication system 230, one or more propulsive elements 235, and a display 240. The battery 215 stores and provides electrical power to elements of the microbot 200, and is preferably a rechargeable battery. The controller 210 comprises logic circuitry and/or a computer processor that is operatively connected to, and configured to provide control functions for, each of the motor 220, the one or more sensors 225, the communication system 230, and the display 240.

In aspects, the communication system 230 is a system that provides for communication with the communication system 120 of the computer device 100. For example, the communication system 230 may comprise at least one antenna that is configured to receive wireless communication signals from an antenna of the computer device 100. In this manner, the microbot 200 may receive control signals from the control module 115, where the control signals instruct the microbot 200 where to move on the surface of the display 105. In additional embodiments, the communication system 230 is also configured to provide wireless communication between respective ones of the microbots 200a-n. In this manner the microbots 200a-n may communicate with one another for swarm control (e.g., self-assembly) of the plurality of microbots 200a-n.

The motor 220 and the one or more propulsive elements 235 cooperate to provide a motive force that moves the microbot 200 relative to the surface of the display 105. In embodiments, the one or more propulsive elements 235 comprise one or more legs, wheels or other propulsive elements that are used to propel a microbot along a surface. In embodiments, the motor 220 is an electric motor (e.g., a direct current (DC) motor) that actuates (e.g., causes movement of) the one or more one or more propulsive elements 235. In aspects, the one or more propulsive elements 235 are designed to be in physical contact with a surface of the display 105 to support the microbot 200 over the display 105 and to move the microbot 200 relative to the surface of the display 105.

In additional embodiments, the microbot 200 is a flying microbot such as a micro-scale flying drone. In this embodiment, the one or more propulsive elements 235 comprise one or more rotors, propellers, or fans that are configured to cause the microbot 200 to fly relative to the display 105.

In embodiments, the one or more sensors 225 include sensors that provide data for controlling the movement of the microbot 200 on the surface of the display 105. The one or more sensors 225 may include a gyroscope, such as a vibrating structure gyroscope, such as a microelectromechanical systems (MEMS) gyroscope, that provides data that is used in directional control of the microbot 200 on the display 105. The one or more sensors 225 may also include one or more proximity sensors, such as infrared proximity sensors, that provide data that is used in determining spatial proximity of one microbot 200 relative to another microbot (or microbots) on the display 105.

In additional embodiments, the microbot 200 includes a wire 237 extending from the chassis 205 to a point of contact with the display 105. In this embodiment, the outer surface of the display 105 is provided with plural electrically conductive portions. In this embodiment, rather than using wireless communication, the communication system 120 may provide communication signals to the microbot 200 via the wire 237 when the wire 237 comes into contact with one of the electrically conductive portions. Additionally or alternatively in this embodiment, when the wire 237 comes into contact with one of the electrically conductive portions, the microbot 200 transmits data defining its identity to the communication system 120 via the wire 237, and the communication system 120 passes this identity data and a location of the respective electrically conductive portion to the control module 115, which uses this location information of the respective microbot 200 relative to the display 105 in determining movement schemes and control signals for this one microbot 200 and/or other ones of the plurality of microbots 200a-n.

In additional embodiments, the microbot 200 includes a suspension element 239 connected between the chassis 205 and each of the one or more propulsive elements 235. The suspension element permits relative movement between the chassis 205 and the one or more propulsive elements 235, e.g., similar to a suspension system of an automobile. In this embodiment, the sensors 225 include one or more sensors that detect a measure of the deflection of each respective suspension element 239. By measuring the deflection of the suspension elements, the system may determine that a user (e.g., a person viewing the content on the display) is pressing down on the microbot 200, and this information may be used in embodiments to control aspects of the movement of one or more of the microbots 200a-n.

Still referring to FIG. 3, according to aspects of the invention, the display 240 is a video display, such as an OLED display, that is configured to display a portion of the video content that is displayed on the display 105. According to aspects of the invention, while the display 105 is displaying the video content, the analysis module 110 (shown in FIG. 2) determines a portion of an image of the video content that is to be covered by a respective microbot 200 and passes this information to the control module 115. Based on this, the control module 115 sends a control signal to the respective microbot 200 (via the communication system 120) to cause the microbot 200 to: (i) move to a position on the display 105 to coincide with a location of the determined portion of the image, and (ii) display the determined portion of the image on its display 240. In embodiments, the determined portion of the image is a relatively small area of the overall image that is part of the video content being displayed on the display 105, and each respective determined one of the microbots 200a-n moves to a different determined portion of the image and displays that determined portion of the image on its display 240. For example, FIG. 4B shows the microbots 200a-n moved to locations over determined portions of the image, but without displaying any portion of the image via their respective displays 240. FIG. 4C shows the microbots 200a-n moved to locations over determined portions of the image with each one of the microbots 200a-n displaying, on its own display 240, the portion of the image that the respective microbot is covering on the display 105. In this manner, the portions of the image that are covered by the microbots 200a-n are reproduced on the displays 240 of the microbots 200a-n.

In embodiments, the portions of the image that are covered by the microbots 200a-n are defined by an object that is moving in the video content that is being displayed on the display 105, e.g., the windmill blades 117 in the example shown in FIGS. 4A-C. In aspects, the video content comprises plural image frames that show movement of the object when displayed in succession, e.g., the windmill blades 117 rotate in the direction D as the video content plays. Accordingly, as the video content plays on the display 105 and the displayed image changes from one image frame to the next, the microbots 200a-n move relative to the display 105 to remain in synchronous motion with the object and simultaneously display their respective portions of the image.

According to aspects of the invention, the analysis module 110 determines the portions of the image that are to be covered by the microbots 200a-n by analyzing the video content that is being displayed on the display 105. In an embodiment, the video content includes data that defines the portions of each image frame to be covered by the microbots 200a-n. For example, each frame of the video content may include data (e.g., metadata) that defines a location of a portion of the image (e.g., an x-y coordinate relative to the display 105). In embodiments, the analysis module 110 obtains (e.g., extracts or decodes) and analyzes this data from the video content and passes it to the control module 115, which controls one of the microbots 200a-n to move to the location defined in the data. Each frame of the video content may have data that defines respective locations of plural such portions, such that the analysis module 110 and the control module 115 cooperate to cause plural ones of the microbots 200a-n to move to the plural respective locations defined in the data. Each frame of the video content may also have data that defines a portion of the image that corresponds to the defined location, in which case the analysis module 110 obtains this data from the video content and passes it to the control module 115, which controls one of the microbots 200a-n to display on its display 240 the portion of the image defined by the data.

In another embodiment, the analysis module 110 determines the portions of the image that are to be covered by the microbots 200a-n using real time video analysis techniques. In this embodiment, the analysis module 110 is configured to perform real time object detection in the series of image frames that make up the video content. The real time object detection may be based on computer vision techniques, for example, and may include pre-processing steps such as image filtering. In this manner, the analysis module 110 may be programmed to detect the location of a moving object in the video content. In this embodiment, after detecting a moving object in the video content, the analysis module 110 divides the object into discrete portions, determines a location of each discrete portion relative to the display 105, and cooperates with the control module 115 to cause the microbots 200a-n to move to locations on the display 105 corresponding to the determined portions of the detected object. In this embodiment and based on the dividing the detected object into the discrete portions, the analysis module 110 may also pass video data for each discrete portion to the control module 115, which controls each of the respective microbots 200a-n to display on its display 240 the video data for its discrete portion. In aspects, the analysis module 110 and control module 115 analyze the video content and control the microbots 200a-n in this manner for each successive frame of the video content.

In the embodiment that is based on real time object detection, it is conceivable that the analysis module 110 may detect more than one moving object in the video content. Accordingly, in response to the analysis module 110 detecting plural moving objects in the video content, the analysis module 110 may be configured to select a single object to from the plural detected objects. In aspects, the selection is based on predefined criteria including at least one selected from the group consisting of: size of each detected object (e.g., stronger preference for selecting the largest sized object from the plural detected objects); location of each detected object in the image frame (e.g., stronger preference for selecting objects that are closer to the center of the image frame); focus of each object (e.g., stronger preference for selecting objects that are in focus); and contrast of the object with a background of the image (e.g., stronger preference for selecting objects with higher contrast).

According to an embodiment of the invention, the analysis module 110 and the control module 115 are configured to control all of the microbots 200a-n individually. In this mode, the analysis module 110 determines a location for each respective one of the microbots 200a-n (e.g., using the techniques already described) and passes the determined locations to the control module 115. The control module 115 then sends respective control signals to each one of the microbots 200a-n, e.g., via the communication system 120, that cause each one of the microbots 200a-n to move to its determined location on the display 105. In aspects, the control signal transmitted to a respective one of the microbots 200a-n includes a direction of movement and a speed for the respective each one of the microbots 200a-n. This is performed for each frame of the video content.

According to another embodiment of the invention, the analysis module 110 and the control module 115 are configured to provide an objective to the microbots 200a-n collectively, and the microbots 200a-n are configured to use self-assembly techniques to move to respective locations on the display 105 to achieve the objective. In this embodiment, the analysis module 110 detects a moving object in the manner described here and determines locations that define an outline (e.g., a perimeter) of the detected object; however the analysis module 110 does not divide the detected object into discrete portions. The analysis module 110 passes the data defining the locations of the outline of the detected object to the control module 115, which formulates a command to the microbots 200a-n as a group to achieve the object of self-assembling in a manner to cover an area on the display 105 that is bounded by the outline. For example, in the use case illustrated in FIGS. 4A-C, the analysis module 110 would determine locations that define an outline of the windmill blades 117. Based on this, the control module 115 would instruct the microbots 200a-n to self-assemble in an area on the display bounded by the locations that define the outline of the windmill blades 117. In response, the microbots 200a-n would communicate with one another and utilize self-assembly techniques to achieve the instructed objective.

According to aspects of the invention, the analysis module 110 is configured to decide whether or not to control the microbots 200a-n to move with an object in the video content based on one or more parameters. For example, the analysis module 110 may be programmed with a maximum movement speed of the microbots 200a-n and may determine that the detected object is moving faster than the maximum movement speed of the microbots 200a-n. Based on this determination, the analysis module 110 decides to not attempt to control the microbots 200a-n to move with the detected object. In another example, the analysis module 110 may be programmed with a physical size of each of the microbots 200a-n, and may decide to not deploy the microbots based on determining that the detected object is too small relative to the size of an individual microbot or that the detected object is too large relative to the collective size of all the microbots 200a-n. In another example, the analysis module 110 may be programmed to cause the microbots to move only within a predefined area of the display 105, e.g., to avoid causing the microbots 200a-n to move too close to an edge of the display 105 and risk falling off the display 105. Other parameters that may be taken into account by the analysis module 110 in deciding whether to deploy the microbots 200a-n include but are not limited to: boundary; dimension; size; color; location; and relative distance to surrounding objects.

In additional embodiments, the learning module 125 (shown in FIG. 2) is configured to train the system based on user interaction and configuration pattern, feedback, and trend analysis. In this embodiment, the learning module 125 obtains user feedback indicating a user's opinion of how well the microbots 200a-n simulated a moving object in the video content displayed on the display 105. In the event that the feedback is negative, the learning module 125 instructs the analysis module 110 to not control the microbots 200a-n to move with this same type of object in future video content that is displayed for this user. In the example of FIGS. 4A-C, in response to the user indicating via feedback that the microbots 200a-n did a very poor job of simulating the movement of the windmill blades 117, the learning module 125 instructs the analysis module 110 to not attempt to simulate the movement of windmill blades in other video content that is displayed for this user.

In embodiments, the learning is based on feedback from plural users regarding a single type of object. For example, the learning module 125 of plural different computer devices may be configured to obtain feedback from plural different users. In the event that the collective feedback from plural different users is negative for simulating a particular object (e.g., a windmill blade), the learning module 125 instructs the analysis module 110 to not control the microbots 200a-n to move with this same type of object in future video content that is displayed for any user.

Figure 5:
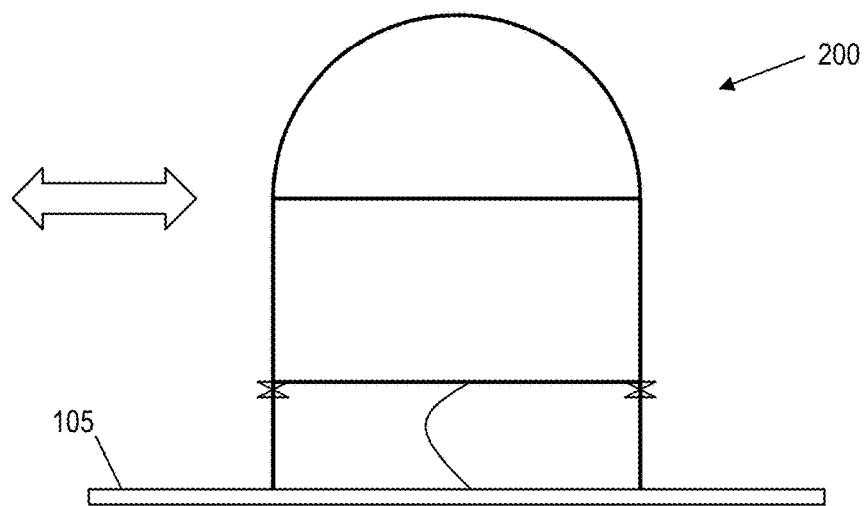
FIGS. 5 and 6 show exemplary implementations of a microbot on a display in accordance with aspects of the invention.
Figure 6:
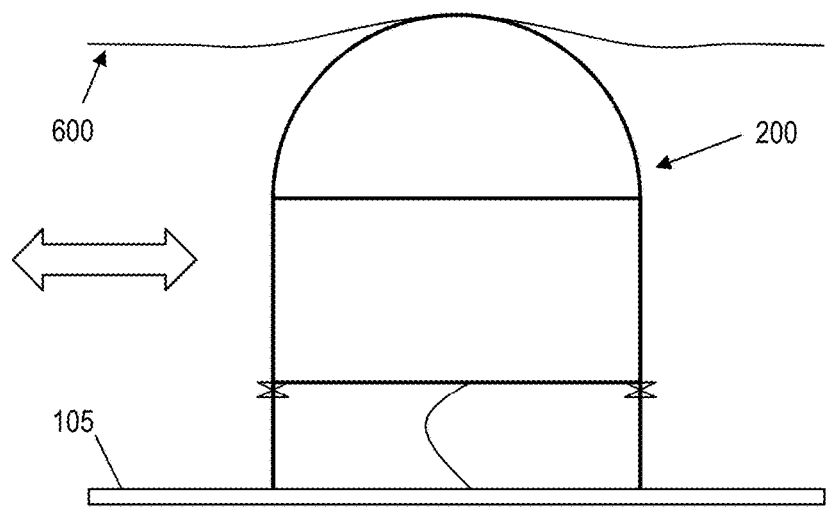

FIGS. 5 and 6 show exemplary implementations of the microbot 200 on the display 105 in accordance with aspects of the invention. As shown in FIG. 5, the microbot 200 physically contacts an upper surface of the display 105 and moves in directions parallel to the upper surface of the display 105. As shown in FIG. 6, the computer device may include a flexible membrane 600 such that the microbots 200a-n (represented here by individual microbot 200) are sandwiched between the upper surface of the display 105 and the membrane 600. In embodiments, the membrane 600 is transparent or translucent, and is flexible such that it deforms where it comes into physical contact with the microbot 200. In embodiments, the membrane 600 is a touchscreen material, such as a resistive or capacitive touch screen material, that is operatively connected to the computer device 100. In this manner, an individual may user touchscreen inputs (e.g., swipe, pinch, etc.) to provide inputs that control the video content that is displayed on the display 105.

In some embodiments, and as described herein, each microbot 200 includes a suspension element 239 and a sensor 225 that measures a deflection of the suspension element 239. According to aspects of the invention, the control module 115 determines that a user is pressing down on the microbot 200 based on the measured deflection of the suspension element 239. For example, as shown in FIG. 4C, a user's hand 400 may come into physical contact with one or more of the microbots 200a-n. In response to this determination, the control module 115 adjusts its control of a microbot 200 that is being pressed by a user. For example, the control module 115 may instruct the microbot 200 to increase the output of the motor 220 to attempt to overcome the force being exerted on the microbot 200 by the user. Additionally or alternatively, the control module 115 may instruct the microbot 200 to move faster (e.g., faster the moving object in the video content) in order for the microbot 200 to catch up to the location of the object in the video content. This control is useful when a user touches one or more of the microbots 200a-n for any reason. This control can be utilized in embodiments with the membrane 600 and also in embodiments without the membrane 600.

Figure 7:
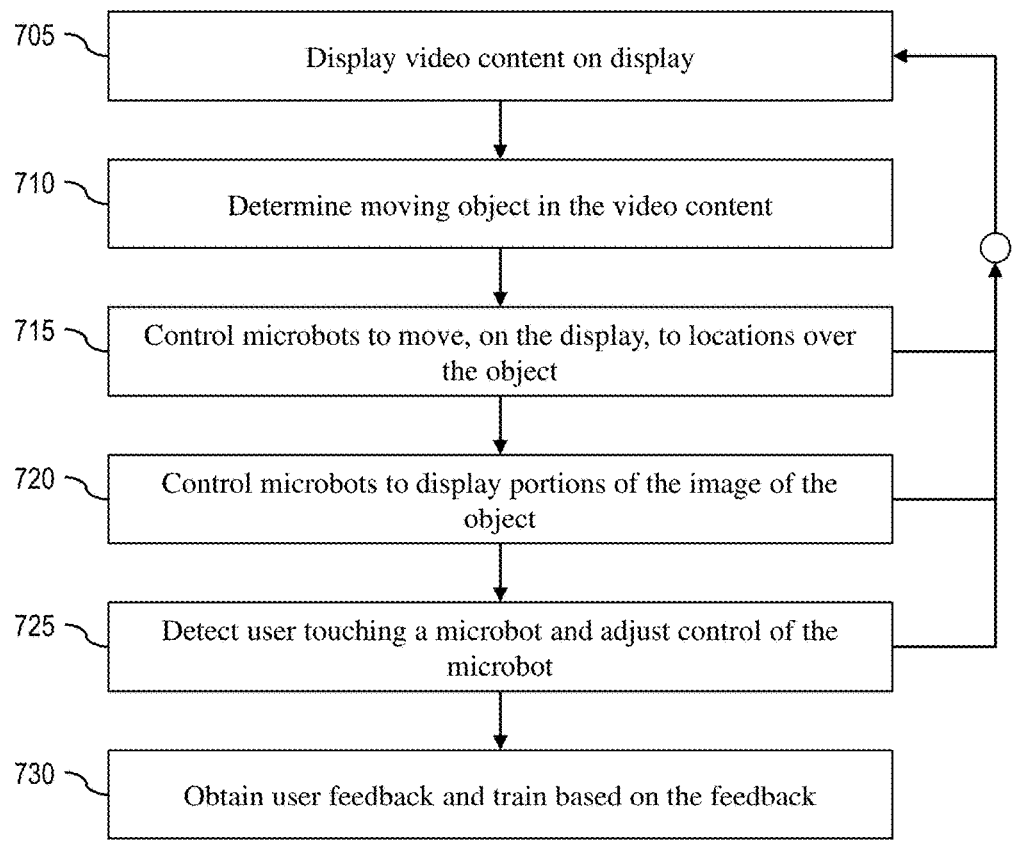
FIG. 7 shows a flowchart of an exemplary method in accordance with aspects of the invention.

FIG. 7 shows a flowchart of an exemplary method in accordance with aspects of the present invention. Steps of the method may be carried out in the environment of FIG. 2 and are described with reference to elements depicted in FIG. 2.

At step 705, the system displays video content on a computer display. In embodiments, and as described with respect to FIG. 2, the computer device 100 displays video content on the display 105.

At step 710, the system determines a moving object in the video content (i.e., the video content of step 705). In one embodiment, and as described with respect to FIG. 2, the analysis module 110 determines the moving object based on data included in or with the video content. In this embodiment, the video content may be tagged with data (e.g., metadata) that defines the location of the moving object in each image frame, and the analysis module 110 determines the object by decoding or extracting this data.

In another embodiment, and as described with respect to FIG. 2, step 710 comprises the analysis module 110 determining the moving object based using real time image analysis such as computer vision based object detection. In this embodiment, the analysis module 110 is programmed to use real time object detection techniques to identify moving objects in successive image frames of the video content. In this embodiment, step 710 may include the analysis module determining plural moving objects and selecting a subset of the plural moving objects (e.g., one) based on criteria, as described with respect to FIG. 2.

At step 715, the system controls microbots to move, on the display, to locations over the object (from step 710). In one embodiment, and as described with respect to FIGS. 2 and 4B, the control module 115 generates and sends control signals (via the communication system 120) to each microbot individually. In this embodiment, the control signal to each respective microbot may include data that instructs the microbot to move to a defined location on the display 105. The control signal to each respective microbot may also include data that defines a speed at which the microbot should move to the defined location on the display 105 and/or a path the microbot should take in moving to the defined location on the display 105.

In another embodiment, and as described with respect to FIG. 2, step 715 comprises the control module sending data defining an objective to at least one of the microbots 200a-n. In this embodiment, the microbots 200a-n then use self-assembly techniques to control their own movement to achieve the objective. The objective may include, for example, data that defines locations of an outline of the object on the display 105. In this example, the microbots 200a-n communicate with one another to control their own movement to move to locations on the display 105 that are within an area defined by the outline.

At step 720, the system controls the microbots to display portions of the image of the object (from step 710). In embodiments, and as described with respect to FIGS. 2 and 4C, the analysis module 110 determines respective portions of the image for each of the microbots 200a-n to display on its display screen 240, and the control module 115 generates and sends control signals to the microbots to cause the microbots to display the determined respective portions of the image. In embodiments, each microbot displays a portion of the object that the microbot is covering on the display 105, e.g., as shown in FIG. 4C.

At step 725, the system detects a user touching one of the microbots and adjusts control of the microbot. In embodiments, and as described with respect to FIG. 2, the control module 115 detects that a user is touching one of the microbots 200a-n based on sensor data that measures deflection of a suspension element in the one of the microbots. In aspects, based on this detecting the control module 115 sends an adjusted control signal to the microbot that is being touched by the user. The adjusted control signal may comprise, for example, a change in power, speed, or direction of the microbot.

After any of steps 715, 720, and 725, the method returns to step 705 to start the next iteration, i.e., to display the next image frame of the video content. In this manner, the system causes the microbots 200a-n to move with the moving object in the video content as the video content is being displayed no the display 105. Steps 720 and 725 are optional and may or may not be performed during each iteration of the method.

At step 730, the system obtains user feedback and trains based on the feedback. In embodiments, and as described with respect to FIG. 2, the learning module 125 obtains user feedback and provides instructions to the analysis module 110 based on the user feedback.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   displaying, by a computer device, video content on a display of the computer device;

determining, by the computer device, a moving object in the video content; and controlling, by the computer device, a plurality of microbots to move, on the display, over locations of the object in the video content.

2. The method of claim 1, further comprising controlling each of the plurality of microbots to display a portion of the object.

3. The method of claim 1, wherein:
the video content includes metadata that defines the moving object; and
the determining the moving object comprises obtaining the metadata.

4. The method of claim 1, wherein the determining the moving object comprises analyzing the video content using computer vision based object detection.

5. The method of claim 4, wherein the determining the moving object comprises:
determining plural moving objects in the video content; and
selecting the moving object from the plural moving objects based on predefined criteria.

6. The method of claim 1, wherein the controlling the plurality of microbots to move comprises transmitting a control signal to each one of the plurality of microbots.

7. The method of claim 6, wherein the control signal transmitted to a respective one of the plurality of microbots includes a direction of movement and a speed for the respective one of the plurality of microbots to move relative to the display.

8. The method of claim 1, wherein:
the controlling the plurality of microbots to move comprises transmitting a control signal to at least one of the plurality of microbots;
the control signal includes data that defines an area on the display; and
the control signal includes an instruction that causes the plurality of microbots to self-assemble on the defined area.

9. The method of claim 1, further comprising:
detecting a user touching one of the plurality of microbots; and
adjusting control of the one of the plurality of microbots based on the detecting.

10. The method of claim 1, further comprising:
obtaining user feedback; and
training a module that performs the determining the moving object based on the feedback.

11. A computer program product, the computer program product comprising a computer readable storage medium having program instructions embodied therewith, the program instructions executable by a computing device to cause the computer device to:
display video content on a display of the computer device;
determine a moving object in the video content; and
control a plurality of microbots to move, on the display, over locations of the object in the video content.

12. The computer program product of claim 11, wherein the program instructions cause the computer device to control each of the plurality of microbots to display a portion of the object.

13. The computer program product of claim 11, wherein:
the video content includes metadata that defines the moving object; and
the determining the moving object comprises obtaining the metadata.

14. The computer program product of claim 11, wherein the determining the moving object comprises analyzing the video content using computer vision based object detection.

15. The computer program product of claim 11, wherein the controlling the plurality of microbots to move comprises transmitting a control signal to each one of the plurality of microbots.

16. The computer program product of claim 11, wherein:
the controlling the plurality of microbots to move comprises transmitting a control signal to at least one of the plurality of microbots;
the control signal includes data that defines an area on the display; and
the control signal includes an instruction that causes the plurality of microbots to self-assemble on the defined area.

17. The computer program product of claim 11, wherein the program instructions cause the computer device to:
detect a user touching one of the plurality of microbots; and
adjust control of the one of the plurality of microbots based on the detecting.

18. The computer program product of claim 11, wherein the program instructions cause the computer device to:
obtain user feedback; and
train a module that performs the determining the moving object based on the feedback.

19. A system comprising:
a processor, a computer readable memory, and a computer readable storage medium;
program instructions to display video content on a display of the computer device;
program instructions to determine a moving object in the video content; and
program instructions to control a plurality of microbots to move, on the display, over locations of the object in the video content such that the plurality of microbots move in synchronous motion with the object as the video content is displayed on the display,
wherein the program instructions are stored on the computer readable storage medium for execution by the processor via the computer readable memory.

20. The system of claim 19, further comprising program instructions to control each of the plurality of microbots to display a portion of the object.

* * * * *